United States Patent [19]

Farlotti

[11] Patent Number: 4,982,208

[45] Date of Patent: Jan. 1, 1991

[54] METHOD AND APPARATUS FOR TRANSFERRING WRITING TOOLS IN A GRAPHICS MACHINE

[75] Inventor: Laurent A. Farlotti, Maisons-Alfort, France

[73] Assignee: Océ Graphics France S.A., Créteil, France

[21] Appl. No.: 285,078

[22] Filed: Dec. 16, 1988

[30] Foreign Application Priority Data

Dec. 22, 1987 [FR] France ................. 87 17940

[51] Int. Cl.$^5$ .................. G01D 15/16; G01D 9/28
[52] U.S. Cl. .................. 346/139 R; 346/1.1; 346/49
[58] Field of Search ............ 346/139 R, 46, 49, 29, 346/1.1

[56] References Cited

U.S. PATENT DOCUMENTS

| | | |
|---|---|---|
| 4,135,245 | 1/1979 | Kemplin et al. |
| 4,518,972 | 5/1985 | Gunderson et al. ............ 346/139 R |
| 4,660,054 | 4/1987 | Kajikawa et al. ............ 346/139 R |
| 4,677,572 | 1/1987 | Gunderson et al. |
| 4,683,476 | 7/1987 | Ferrari et al. |

FOREIGN PATENT DOCUMENTS

| | | |
|---|---|---|
| 2755586 | 7/1978 | Fed. Rep. of Germany . |
| 2082510 | 3/1982 | United Kingdom . |
| 2115565 | 9/1983 | United Kingdom . |

*Primary Examiner*—Mark J. Reinhart
*Attorney, Agent, or Firm*—Bruce D. Riter

[57] ABSTRACT

A writing tool (30) carried by a write head (10) of a drawing machine is transferred to an empty station in a storage turret by bringing the write head carrying the writing tool to a transfer position, engaging the writing tool in the station of the storage device by lowering the tool, and disengaging the writing tool from the write head by moving the write head away from the transfer position. A writing tool is transferred from a station of the storage device to the write head by engaging the writing tool on the write head by bringing the write head into the transfer position, disengaging the writing tool from its station in the storage device by raising the tool, and displacing the write head together with the writing tool away from the transfer position. Tool transfer is thus provided solely by a combination of the vertical tool movements and the displacement of the write head along a given direction as normally required for the purpose of plotting on a print medium.

13 Claims, 4 Drawing Sheets

METHOD AND APPARATUS FOR TRANSFERRING WRITING TOOLS IN A GRAPHICS MACHINE

BACKGROUND OF THE INVENTION

1. Field of the Invention

The present invention relates to graphics machines, and more particularly to a method and apparatus for automatically transferring writing tools in graphics machines.

A particular field of application of the invention is pen plotters, however, the invention is applicable, more generally, to any graphics machine of the type comprising: a write head provided with means for fixing a removable writing tool; actuator means for displacing the writing tool as carried by the write head along a first direction between a working position in contact with a print medium and a rest position out of contact with the print medium; and means for displacing the write head along a second direction relative to the print medium in order to plot predetermined graphics patterns thereon by means of the writing tool carried by the head.

2. Description of Related Art

Graphics machines, and in particular X-Y pen plotters are known in which a write head is generally movable in translation along a single horizontal direction (Y) parallel to the print medium, at least in the working zone of the write head, while the print medium is engaged with drive means in order to enable it to be displaced in another horizontal direction (X) perpendicular to the first. A desired plot is produced on the print medium by an appropriate combination of movements in the X and Y directions of the print medium and of the write head while it is carrying a writing tool in the working position.

Graphics machines of the above type are known in which means are provided for enabling the writing tool to be changed automatically. Such a transfer is obtained by displacing the write head to a writing tool transfer position in the immediate vicinity of a storage device in which a plurality of writing tools are stored. The storage device is generally in the form of a rotary magazine or turret with stations formed in its periphery for receiving respective writing tools.

A device for changing the writing tool in a drawing machine is described in U.S. Pat. No. 4,683,476 (Ferrari et al). In this prior device, the write head is provided with means exerting a first magnetic attraction force on the body of the writing tool in order to hold the tool fixed to the head, and the storage device is provided with means exerting a second magnetic force for holding the writing tools which are stored in their stations. The intensity of at least one of the two magnetic attraction forces is capable of being varied to enable a writing tool to be transferred from the write head to the storage device and back again under the effect of the difference between the magnetic attraction forces acting on the tool. With this prior device, the writing tool is fixed to the write head or to the storage device under the effect of a magnetic force extending transversely relative to the tool-lowering and tool-raising directions. This provides a structure which is simpler than other prior art devices for changing writing tools in which the tool is released from the write head or from the storage device by unlocking mechanical systems under the effect of contact between the head and the storage device.

In the device of above-mentioned U.S. Pat. No. 4,683,476, a moving cap is associated with each station in the storage device for the purpose of protecting and enclosing the tip of the writing tool contained in the station. Means need to be provided for displacing the cap in order to enable the writing tool to be transferred in and out of the corresponding station. Cap displacement is obtained by a fixed magnet which exerts a magnetic attraction force on that one of the caps facing the write head in its transfer position.

SUMMARY OF THE INVENTION

It is object of the present invention to provide a simplified method for transferring a writing tool to and from a storage device.

Another object of the invention is to provide a transfer method which does not require the write head to be specially adapted.

A further object of the invention is to provide a transfer method which can be implemented using a tool storage device which does not have any moving parts, i.e., a storage device which is very simple in structure and which is consequently cheap.

This and other objects are attained, according to a first aspect of the invention, by a method of transferring a writing tool in a graphics machine including:

a storage device having a plurality of stations for storing spare writing tools;

a write head releasably holding a writing tool, said writing tool being movably mounted on said write head in a first direction between a working position in contact with a print medium and a rest position out of contact with the print medium, said write head being movably mounted along a second direction relative to the print medium in order that predetermined graphical patterns be printed thereon by the writing tool when said writing tool is in the working position;

the method comprising the steps of:

moving the write head towards the storage device along the second direction to the vicinity of the storage device; engaging said writing tool in a free station of the storage device by a relative movement along said first direction between the storage device and the write head; and moving the write head away from the storage device along the second direction to release the writing tool from the write head thereby transferring the writing tool from the write head to the storage device.

A remarkable advantage of the transfer method of the invention stems from the fact that the entire process of transferring a writing tool from the write head to the storage device, or vice versa, can be performed solely by combining movements which are the same as the movements required for printing using the machine, namely lowering and raising the writing tool and displacing the write head along its trajectory.

No special adaptation of the write head, no special motion command, and no special force is required for performing the operations required to change writing tools.

Advantageously, the tip of the writing tool is inserted in a corresponding protective cap associated with each station in the storage device, and is removed from said cap, by the same tool-lowering and tool-raising movements which are performed to engage the writing tool in the station of the storage device or to disengage it from said station.

There is thus no need to provide moving caps and means for causing the caps to move, and as a result the storage device can be made entirely without any parts that move relative to the remainder of the device.

In another aspect of the invention, a graphics machine comprises:

a write head including means for releasably holding a writing tool;

means on the write head for moving the writing tool along a first direction between a working position in contact with a print medium and a rest position out of contact with the print medium;

means for moving the write head relative to the print medium along a second direction in order that predetermined graphics patterns be plotted thereon by the writing tool in said woring position; and a storage device including a plurality of stations for storing spare writing tools, each station comprising first retaining means engageable by second retaining means on each writing tool when said writing tool is inserted in said station by a relative movement along said first direction for preventing movement of said writing tool in said second direction away from said storage device.

BRIEF DESCRIPTION OF THE DRAWING

The invention will be better understood from the following description made by way of non-limiting example and with reference to the accompanying drawings, in which:

FIG. 3 is a plan view of the storage device shown in FIG. 2; and

DETAILED DESCRIPTION OF THE PREFERRED EMBODIMENTS

Figure 1:
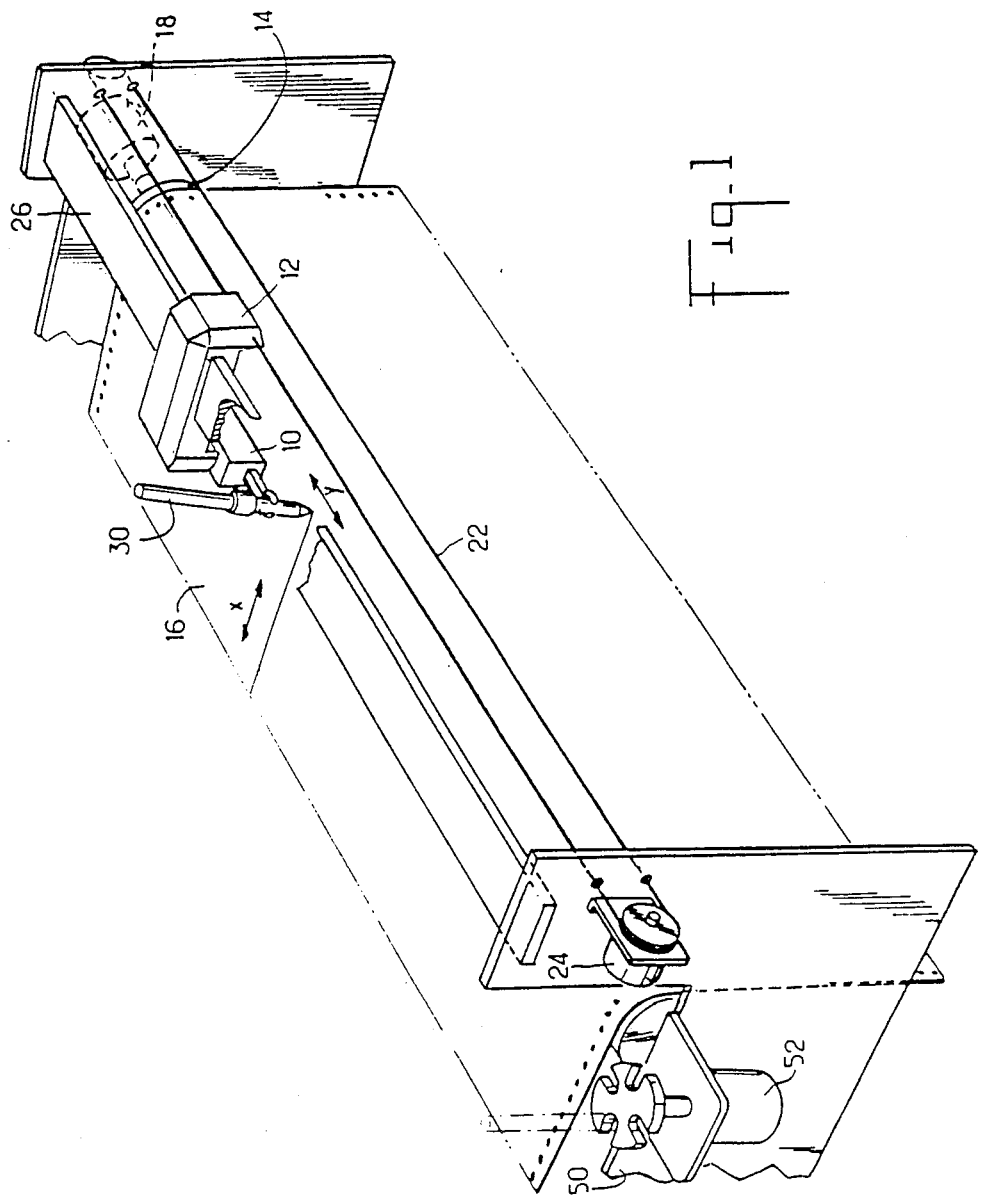
FIG. 1 is a highly diagrammatic overall view of a drawing machine.

FIG. 1 is a diagram showing a portion of a drawing machine which comprises, in conventional manner, a write head 10 mounted on a carriage 12 and carrying a writing tool 30, together with a drum 14 over which there passes a print medium such as a sheet of paper 16.

The drum 14 is rotated by means of a motor 18 whose outlet shaft is coupled, e.g. directly, to the shaft of the drum 14. Rotating the drum in one direction or the other causes the sheet 16 to move longitudinally forwards or backwards along an X direction. The sheet 16 is prevented from slipping relative to the drum 14, e.g., by means of studs projecting from the drum and cooperating with perforation formed along the edges of the sheet, or else by means of pressure wheels pressing the sheet against the drum.

The write head 10 is movable in translation along a transverse horizontal direction Y which is parallel to the axis of the drum 14 and perpendicular to the direction X. To this end, the carriage 12 may be fixed to a tape or a cable 22 which is driven in one direction or the other by a motor 24. As it moves, the carriage 12 is guided along one or more slides 26.

The writing tool 30 is movable in translation relative to the sheet 16 between a working position (lowered position) in which the tip of the writing tool is in contact with the sheet 16, and a rest position (raised position) in which the tip of the writing tool is not in contact with the sheet 16. In the lowered position, the writing tool is in contact with the sheet 16 in a writing zone situated parallel to and in the proximity of the top generant line of the drum 14, or indeed along said generant line. Various actuator means may be used to move the writing tool from its raised position to its lowered position, and back again. One particular implementation of such actuator means is described below with reference to FIGS. 2 and 3.

Finally, FIG. 1 also shows in highly diagrammatic manner a rotary magazine or turret 50 with a plurality of stations formed in its periphery for the purpose of automatically changing the writing tool carried by the head. A changeover is performed by bringing the write head 10 into a transfer position adjacent to the turret 50, with said position corresponding to one or other of the end positions of the stroke of the write head. The turret 50 is rotatable by a motor 52 in order to present a write head in the transfer position either with an empty station ready to receive the tool carried by the head, or else a station occupied by a tool to be transferred to the head.

Figure 2:
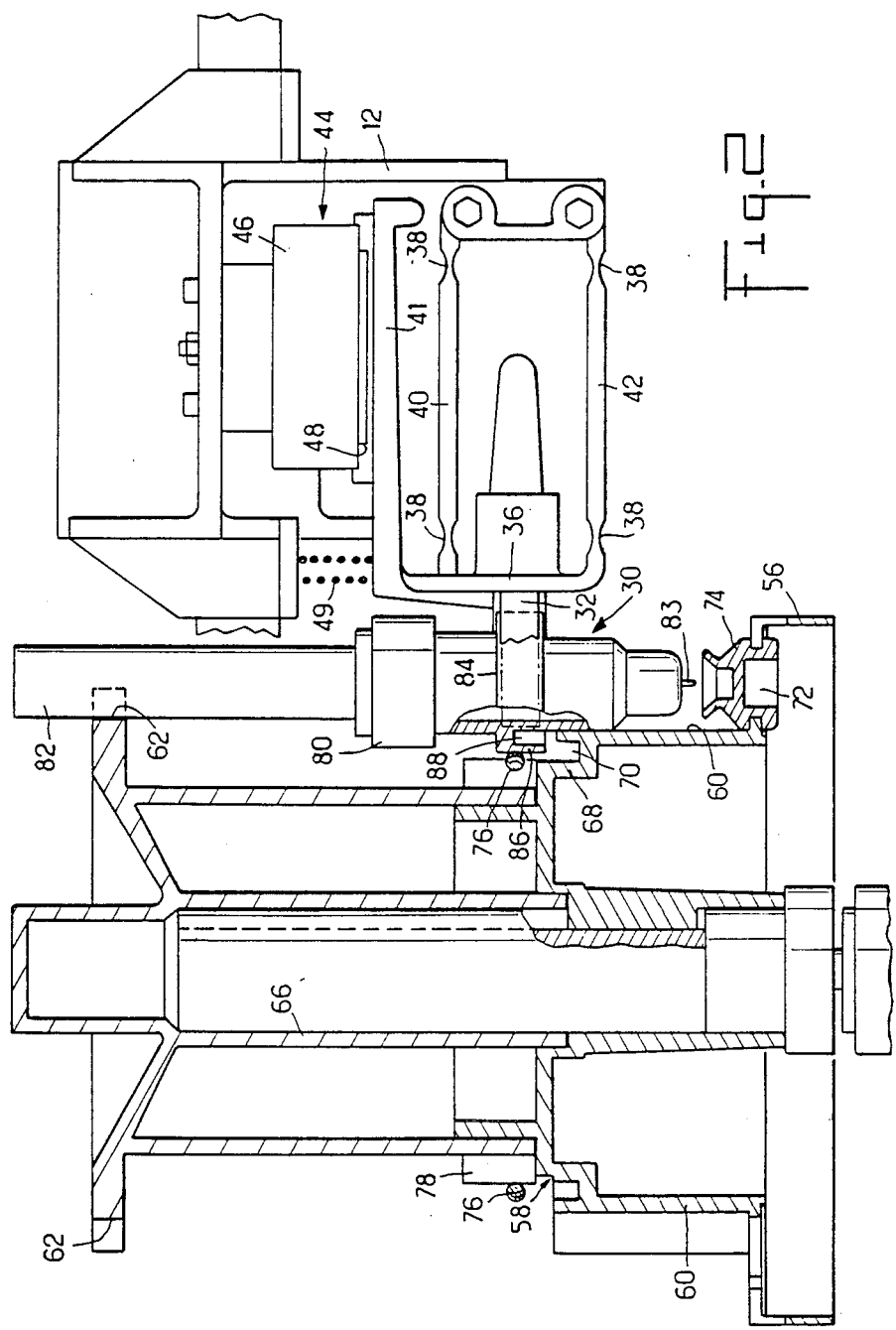
FIG. 2 is a more detailed view in partially cut-away elevation (taken along section line II—II of FIG. 3) of the storage device and a portion of the write head of the machine shown in FIG. 1 and serving to illustrate the method of changing a writing tool in accordance with the invention.

FIGS. 2 and 3 are more detailed views of a turret 50 and the write head 10 in its transfer position and carrying a writing tool 30, thereby enabling the method of the invention to be performed.

The writing tool is fixed on the head 10 by releasable holding means such as a clamp 32 fixed to the body 36 of the head 10. The clamp 32 has a fixed jaw 33 fixed to the head body 36, and a hinged jaw 34 hinged to the head body. A spring 35 exerts a return force on the hinged jaw 34 in order to clamp the body of the writing tool between the jaws 33 and 34 and prevent any relative motion between the writing tool 30 and the clamp 32 whenever writing operations are being performed.

In the example shown, the movements of lowering and raising the writing tool are obtained by reversibly deforming the head body 36 as described in copending U.S. application Ser. No. 175,045 filed on Mar. 30, 1988. In brief, the head body is constituted by a single piece, in the form of an elastically deformable parallelogram, e.g. by molding a plastic material such as polypropylene. The head body is made deformable by forming thin portions 38 in the links 40 and 42 interconnecting the front portion of the head body 36 carrying the clamp 32 to the rear portion of the head body 36 which is fixed rigidly to the carriage 12.

The deformations of the head body 36 causing the writing tool to be raised or lowered are themselves generated by an actuator 44 acting directly on the head body, and in particular on an arm 41 fixed to the front portion of the head body 36. The actuator 44 is of the electromagnetic type, for example, having an assembly 46 carried by the carriage 12 and constituted by a plane piece of soft iron with two permanent magnets mounted thereon, and a coil 48 which is vertically movable in the field set up by the assembly 46 whenever a current is caused to flow in the coil. Depending on the direction in which the current flows therethrough, the coil 48 which is fixed to the arm 41, is displaced either downwardly to deform the head body so as to bring the tool into the lowered writing position, or else upwardly so as to bring the writing tool into the raised position. A traction spring 49 exerts a return force on the head body in order to return the writing tool to the raised position when the machine is not switched on. Although the spring 49 is selected to exactly counterbalance the weight of the tool-carrying write head so as to have no effect during writing, it is preferable to use the actuator to return the tool into the raised position so as to ensure that the tool is raised quickly and accurately.

Naturally, other ways of making the write head could be used.

For example, it is possible to use a rigid clamp body carrying the writing tool by means of a clamp such as that shown at 32 in FIGS. 2 and 3 and hinged to the carriage 12. The writing tool is then raised and lowered by pivoting the clamp body in one direction or another by any appropriate mechanical, electromechanical, or electromagnetic means, e.g., by means of an electromagnet.

In yet another variant, it is possible to use a write head as described in above-mentioned U.S. Pat. No. 4,683,476. The writing tool is fixed to the write head by a magnetic attraction force produced by a permanent magnet and acting on the body of the writing tool. The writing tool is held laterally pressed against wheels carried by the write head and the writing tool lowering and raising movements are generated by displacing the tool relative to the head by means of an electromagnetic force acting on the body of the writing tool in addition to the magnetic attraction force holding the tool sideways against the head.

Regardless of which means are used to raise and lower the writing tool, these means are also used for engaging the writing tool in a station in the turret 50 or for removing a writing tool from its station.

As shown in FIGS. 2 and 3, the turret 50 comprises a turret body with a plurality of stations 54 formed in the periphery thereof, with each station being intended to receive a writing tool in the vertical position (FIG. 2). In FIG. 3, only the writing tool 30 carried by the head in the transfer position can be seen, with the other writing tools stored in the turret 50 not being shown.

The turret body comprises a circular horizontal base 56 with a vertical hub 58 standing in the middle thereof and coupled to rotate with the outlet shaft of the turret drive motor 52.

The stations 54 are constituted by recessed portions which are regularly distributed around the periphery of the hub 58. In the example shown, there are eight stations.

Vertical abutment surfaces 60 and 62 are formed in each station 54 to be engaged by the writing tools. One of the abutment surfaces 60 is formed at the bottom of the station by an outside wall portion 64 of the hub 58 which projects a little way into the station. The cross-section of the abutment surface 60 is in the form of an arc of a circle and its curvature matches the curvature of that portion of the writing tool body which is intended to come into abutment against the surface 60. Abutment surface 62 is formed in the top portion of the station in order to co-operate with the top portion of the writing tool.

In the example shown, the top portion of the turret is constituted by a part 66 (not shown in FIG. 3), e.g. a molded plastic part which is fixed onto the hub 58. The abutment surfaces 62 are formed by ribs projecting outwardly into each station, from the top of the part 66.

In each station 54, the outside wall portion 64 of the hub 58 is connected near its top to the central portion of the same hub 58 via a horizontal stepped portion 68 having a first retaining means such as a groove 70 formed therein with an upwardly open U-shaped cross-section. The groove 70 extends horizontally over a circular arc having the same center as the horizontal cross-section of the abutment surface 60.

Holes 72 are formed in the base 56 of the turret, with each hole 72 being vertically aligned with the location of a writing tool in a station 54.

Caps 74 (not all shown),e.g. made of rubber, are force-fitted in the holes 72 in order to be fixed therein. Each cap 74 opens upwards so as to receive the tip of a writing tool and thus protect it.

Finally, the turret is provided with biasing means such as an annular spring 76 surrounding the hub 58 for downwardly urging the writing tools in the grooves 70 and in the caps 74 as explained below. The spring 76 bears against projections 78 formed around the periphery of the hub 58 (see FIG. 3).

The body of the writing tool 30 is formed by a tubular part 80 constituting a tool carrier in which the writing member 82 per se is inserted, with the writing member being a consumable item. The tool carrier 80 has second retaining means comprising a collar 84 with a downwardly directed outer vertical rim 86 for forming a downwardly open groove 88.

Figure 4:
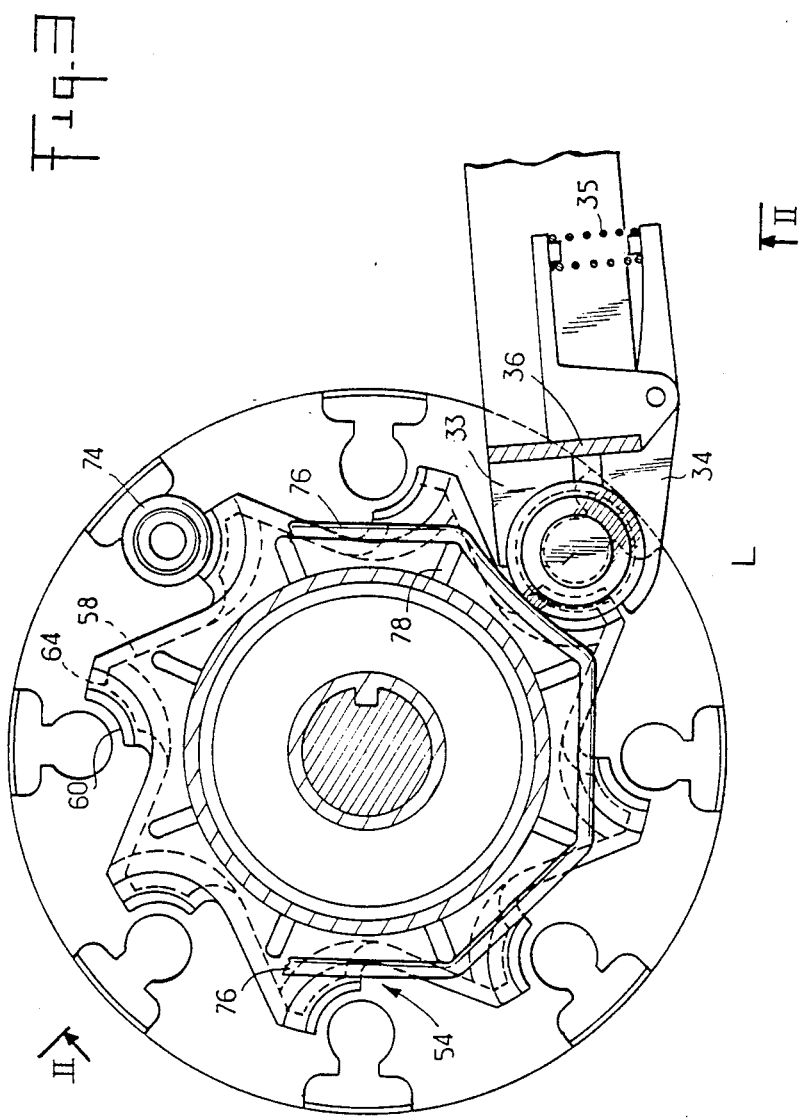
FIGS. 4A and 4B are fragmentary detail views on a larger scale respectively showing a writing tool immediately prior to engagement in a station of the storage device, and after engagement therein.
Figure 4B:
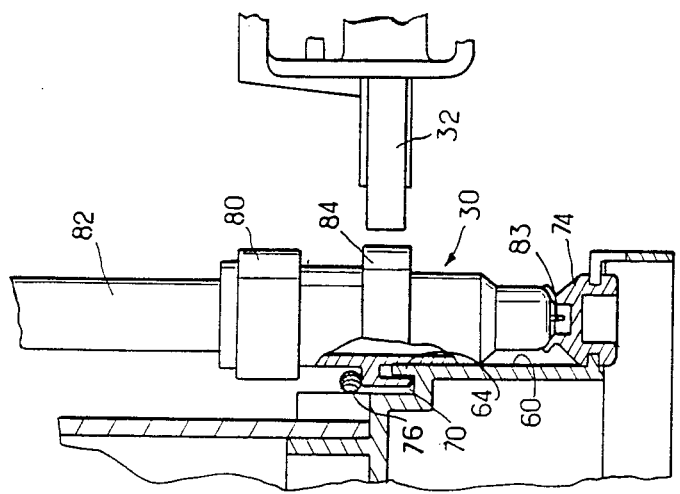
Figure 4A:
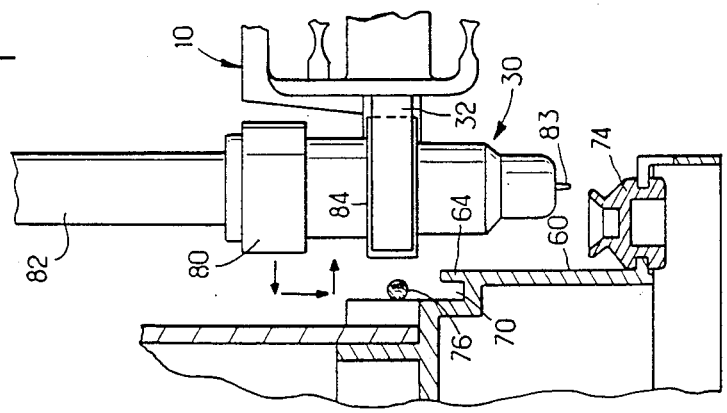

FIGS. 4A and 4B show a writing tool 30 respectively before and after being engaged in one of the stations of the turret.

The write head carrying the tool 30 is brought to the transfer position with the tool 30 in a high intermediate vertical position (FIG. 4A). The head is displaced until said tool 30 comes into abutment against the surfaces 60 and 62 of the station in which it is to be placed, with the fixed clamp pushing the annular spring 76 towards the inside of the turret. As can be seen in FIG. 4A, with the tool in its high transfer position, the collar 84 of the tool carrier 80 passes over the top of the outside wall portion 64, while the tip 83 of the writing member passes over the edge of the cap 74.

When the tool comes into abutment against the abutment surface 60, instructions are sent to lower the writing tool. This downward movement causes the outside rim of the collar 84 to penetrate into the groove 70 while, simultaneously, the tip 83 of the writing member 82 penetrates into the cap 74 and, at the end of its stroke, compresses the cap 74. Thus, a simple tool-lowering command suffices simultaneously to hook the tool carrier 80 to the turret and also to insert the tip of the writing tool into the protective cap 74.

Once the tool has been lowered into the turret station, the write head is caused to move away from the turret. Since the writing tool is hooked to the turret by the collar 84, withdrawing the write head causes the clamp 32 to open against the force exerted by the spring 35. The writing tool is thus automatically disengaged from the head. The spring 76 returns over the collar 84 and holds the writing tool in the groove 70 and in the cap 74 (FIG. 4B).

A writing tool is withdrawn from its station in the turret to be transferred to the write head by performing the reverse sequence of operations.

The write head is brought to the transfer position with the clamp 30 being in a low intermediate vertical position. As the write head is displaced, the clamp 30 comes into contact with the collar 84 on the writing tool and the clamp is forced to open against the force of the spring 35 in order to grasp the tool. It may be observed that the tool body is grasped by the clamp level with the collar 84. As can be seen in FIG. 3, the stations 54 are shaped in such a manner that the grasping of the tool body by the clamp is not hindered by interference between the jaws of the clamp and the hub of the turret, even though these jaws surround the body of the writing tool over an arc of more than 180°. As a result, it is necessary, in particular, for the arc along which the bearing surfaces 60 and the grooves 70 extend, to be smaller than the arc left free on the body of the writing tool between the ends of the jaws of the clamp 30. During this movement, the fixed jaw of the clamp pushes the spring 76 inwardly.

Once the tool body has been grasped by the clamp, the tool is caused to move upwardly so as to disengage the collar 84 from the groove 70 and the tip of the writing member from the cap 74. Once the tool has been moved to its raised position, it may be displaced away from the turret.

Three movements are involved for transferring a writing tool to and from the write head: (1) rotating the turret (by means of motor 52); (2) moving the write head along the Y axis (by means of motor 18); and (3) moving the writing tool up and down (by means of actuator 44). To effect these movements, motor 52, motor 18 and actuator 44 are operated by electronic operating circuits (not illustrated) controlled by a microprocessor (not illustrated) in any conventional manner.

For example, the turret 50 may include a reference (or zero) position detector (not illustrated), and motor 52 may be a stepper motor. Turret 50 may be rotated by motor 52 such that a selected station is located opposite the path of write head 10 by first rotating the turret to the reference or zero position, and then rotating the turret a given angle corresponding to a given number of pulses sent to motor 52.

Also by way of example, motor 18 may be a servomotor, and the position of the write head 10 along the Y direction may be given by a Y position detector (not illustrated) associated with motor 18. The head may be moved to the Y position at which the writing tool is to be transferred by reading a $Y_0$ coordinate which is predetermined and stored in a memory. Other suitable equipment may, of course be used to effect movement of the head for writing lines on the sheet of paper.

The writing tool may be brought to the high (or low) transfer position by feeding coil 48 of actuator 44 with positive (or negative) DC current. This high (or low) transfer position is the uppermost (or lowermost) position of the writing tool with respect to the head. These up and down movements may also be effected by any suitable means to write lines on the paper. Operating circuits for the motors and actuator are well-known in the art.

The sequence of operating steps needed for implementing the transfer method explained with reference to FIGS. 4A and 4B may be stored in a read-only memory (ROM) connected to the microprocessor. This sequence of operating steps may comprise a routine for transferring a writing tool from the head to the turret and a routine for transferring a writing tool from the turret to the head.

As shown in FIG. 4B, the annular spring 76 exerts downwards and outwards thrust on each of the writing tools stored in the turret at a level which is slightly higher than that of their collars 84. As a result of this thrust, each writing tool is in vertical equilibrium between the spring 76 and the upwards resilient thrust from the cap 74, and is thus held in the groove 70, thereby enabling the writing tools to remain in accurately defined fixed positions inside the stations 54. As a result, the write head always grasps a writing tool properly when said tool is situated in the station facing the write head as the head is brought into its transfer position. Further, the writing tools are held in the turret by the spring 76 well enough to enable the turret 50 to be removed from the drive shaft 52 without the writing tools it contains spilling out therefrom.

Means other than the annular spring could be used for holding the writing tools in position in the stations of the storage device, for example means which exert a magnetic attraction force, such as permanent magnets acting on the bodies of the writing tools.

In the embodiment of the invention described above, a writing tool is engaged in a station of the turret and subsequently disengaged therefrom by respective tool lowering and tool-raising movements. Although this is a preferred implementation of the invention, other forms of relative vertical motion between the storage device and the tool could be used. Thus, it would be possible for the tool to be engaged in a station of the turret by raising the tool and to be disengaged by the opposite downwards movement, in which case appropriate retaining means between the turret and the writing tool would need to be provided.

I claim:

1. A method of transferring a writing tool in a graphics machine including:
    a storage device having a plurality of stations for storing spare writing tools; and
    a write head releasably holding a writing tool, said writing tool being movably mounted on said write head in a first direction between a working position in contact with a print medium and a rest position out of contact with the print medium, said first direction being approximately perpendicular to the plane of the print medium where the writing tool contacts the print medium, said write head being movably mounted along a second direction relative to a print medium in order that predetermined graphical patterns be printed thereon by the writing tool when said writing tool is in the working position;
    the method comprising the steps of:
    moving the write head towards the storage device along the second direction to the vicinity of the storage device;
    engaging said writing tool in a free station of the storage device by a relative movement along said first direction between the storage device and the write head; and
    moving the write head away from the storage device along the second direction to release the writing tool from the write head, thereby transferring the writing tool from the write head to the storage device.

2. A method according to claim 1, further comprising the steps of:
    moving said write head towards the storage device along the second direction to grasp a spare writing tool stored in a station of said storage device,
    disengaging said spare writing tool for the storage device by a relative movement along said first direction between the storage device and the write head; and moving said write head away from the storage device along the second direction to release the spare writing tool from the storage device thereby transferring the spare writing tool from the storage device to the write head.

3. A method according to claim 2 wherein said engaging step comprises moving the write head along the first direction towards the working position and said disengaging step comprises moving the write head along the first direction towards the rest position.

4. A method according to claim 1 wherein each said station comprises a protective cap fixed thereto, said engaging step comprising inserting a tip of said writing tool in said protective cap during said relative movement along said first direction.

5. A graphics machine comprising:
a write head including means for releasably holding a writing tool;
means on the write head for moving the writing tool along a first direction between a working position in contact with a print medium and a rest position out of contact with the print medium;
means for moving the write head relative to the print medium along a second direction in order that predetermined graphics patterns be plotted thereon by the writing tool in said working position; and
a storage device including a plurality of stations for storing spare writing tools, each station comprising first retaining means engageable by second retaining means on each writing tool when said writing tool is inserted in said station by a relative movement along said first direction for preventing movement of said writing tool in said second direction away from said storage device.

6. A machine according to claim 5, characterized in that each station of the storage device includes a cap which is fixed relative to the storage device and which has an opening directed in said first direction to enable the tip of a writing tool to be inserted in said cap during said relative movement along said first direction between said write head and said storage device.

7. A machine according to claim 5 wherein said second retaining means comprises a collar fromed around the writing tool and said first retaining means comprises a groove provided in said the storage device, said collar being adapted to be inserted in said groove during said respective movement along said first direction between said writing tool and said storage device.

8. A machine according to claim 5 wherein said storage device includes biasing means for urging said spare writing tools in said first direction to releasably maintain said first and second retaining means engaged with each other for each writing tool stored on said storage device.

9. A writing tool storage device rotatably mounted on a graphics machine about an axis parallel to a first direction, said device comprising a plurality of stations around its periphery, each of said stations including first retaining means, each writing tool including second retaining means, said first and second retaining means being engageable by a relative movement of said storage device and said writing tool along said first direction for preventing movement of said writing tool away from said storage device in a second direction perpendicular to said first direction thereby releasable storing spare writing tools on said storage device.

10. A storage device according to claim 9 wherein said second retaining means comprises a collar disposed at the periphery of each writing tool and said first retaining means comprises a groove in each of said stations, said groove being sized to receive said collar during said respective movement along said first direction between said writing tool and said storage device.

11. A storage device according to claim 9 wherein each said station includes a cap in which the tip of a writing tool is inserted during said respective movement along said first direction between said writing tool and said storage device.

12. A storage device according to claim 9, further comprising biasing means for urging said writing tools in said first direction to releasably maintain said first and second retaining means engaged with each other for each writing tool stored on said storage device.

13. A storage device according to claim 12 wherein said biasing means comprises an annular spring disposed around the periphery of said storage device.

* * * * *